2 Sheets--Sheet 1.

C. HODGKINS.

Sewing-Machine.

No. 6,596.

Reissued Aug. 17, 1875.

Witnesses.

Thomas B. Dewey.

Geo. E. Hetzel

Inventor.

Christopher Hodgkins

Stephen Ustick, attorney

2 Sheets--Sheet 2.

C. HODGKINS.

Sewing-Machine.

No. 6,596.

Reissued Aug. 17, 1875.

Witnesses.

Thomas J. Dewey.

George E. Hegel

Inventor.

Christopher Hodgkins.

Stephen Ritick Attorney

UNITED STATES PATENT OFFICE.

CHRISTOPHER HODGKINS, OF MARLBOROUGH, NEW HAMPSHIRE, ASSIGNOR TO NESBITT D. STOOPS, OF PHILADELPHIA, PENNSYLVANIA.

IMPROVEMENT IN SEWING-MACHINES.

Specification forming part of Letters Patent No. 69,666, dated October 8, 1867; reissue No. 6,596, dated August 17, 1875; application filed July 7, 1875.

*To all whom it may concern:*

Be it known that I, CHRISTOPHER HODGKINS, of Marlborough, in the county of Cheshire and State of New Hampshire, have invented a new and useful Improvement in Sewing-Machines, which improvement is fully set forth in the following specification, reference being had to the accompanying drawings.

My invention consists, in the first place, of an improved means of giving a proper degree of tension to the thread, and, in the second place, of a detachable and adjustable feed mechanism, as hereinafter set forth.

Figure 1:
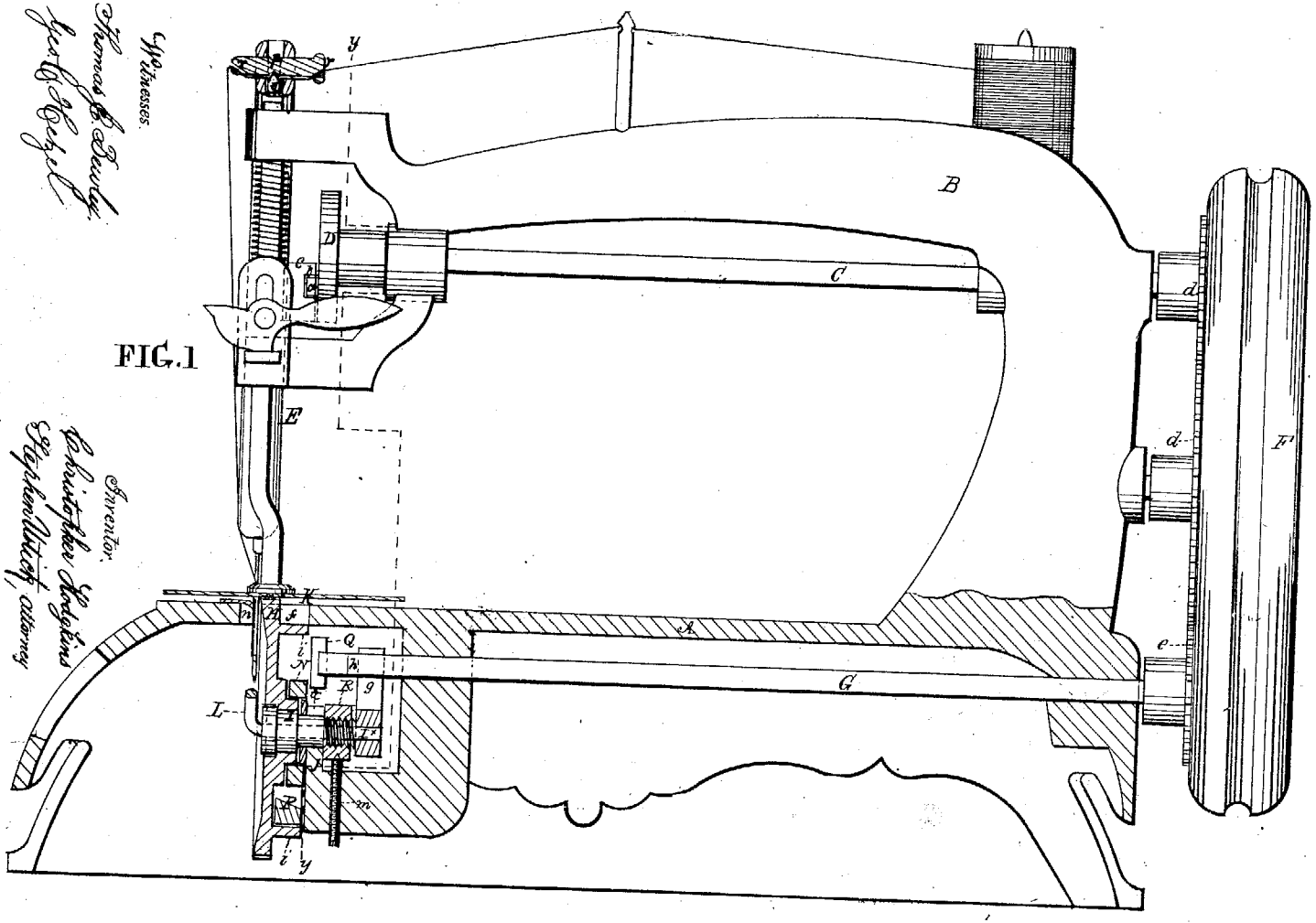
Figures 2, 3:
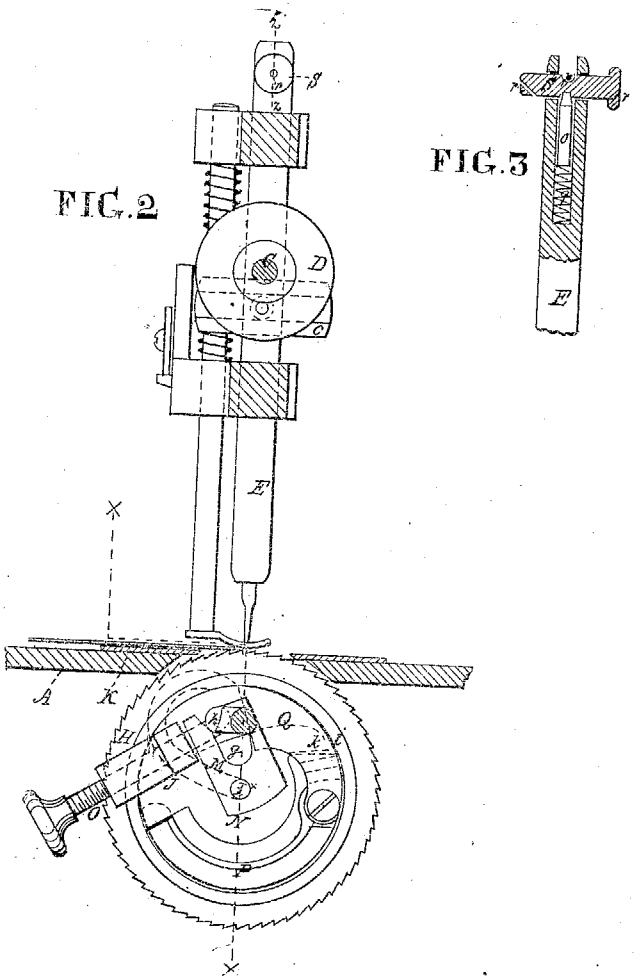

In the accompanying drawings, Figure 1 is a side view of my invention, partly in section, as indicated by the lines *x x*, Fig. 2. Fig. 2 is a vertical section of a portion of the same, taken in the line *y y*, Fig. 1; Fig. 3, a vertical section of a portion of the same, taken in the line *z z*, Fig. 2.

Like letters of reference in all the figures indicate the same parts.

A represents the base of the machine; B, the arm attached to the base, and of curved form, as shown clearly in Fig. 1. C is the driving-shaft, having its bearings in the arm B, and a wheel or circular plate, D, on its outer end, to which a pin or wrist, *a*, is attached at a suitable distance from its center, said pin or wrist working in a horizontal groove, *b*, in a cross-bar, *c*, attached to the needle-arbor E, the bearings or guides of which are at the outer end of the arm B. The pin or wrist *a* of the wheel D, working in the groove of bar *c*, communicates an up-and-down movement to the needle-arbor E. The shaft C is driven by gearing *d* from a crank-wheel, F, and a horizontal feed-wheel shaft, G, underneath or within the base A is driven, by gearing *e*, from the same crank-wheel F. H is the feed-wheel. It revolves on the short shaft I, which is detachable and adjustable, as hereinafter described. The feed-wheel has a toothed or serrated edge or periphery, and it projects through the slot *f* of the bed-plate A and needle-plate K, as shown in Figs. 1 and 2. I* is a small shaft, which turns freely in a longitudinal opening in the shaft I. It has a hook, L, on its outer end, of usual form. On the inner end of the shaft I* there is attached a plate, M, provided with a curved slot, *g*, in which is a crank, *h*, on the outer end of the shaft G. (See Figs. 1 and 2.) The wheel H, at its inner side, is provided with an annular concentric flange, *i*, and within the circular recess formed by said flange there is a hub, N, which is fitted loosely on the shaft I, and has an arm or projection, *j*, a portion of which extends over the flange *i*, and has a screw, O, passing through it, as shown clearly in Fig. 2, the other portion of said projection being at the inner side of the flange *i*, and nearly in contact with it. The hub N also has a projection, K, extending from it nearly opposite to *j*. P Q represent two dogs, connected together by a pivot, *l*. One dog, P, is a portion of a ring, and is fitted around the hub N, not in contact therewith, but in contact with the inner surface of the flange *i*, the free or disengaged end of P being in contact with the portion of the projection *j* of the hub, which is at the inner side of the flange *i*. (See Fig. 2.) The inner side of the dog Q is provided with a shoulder, against which the end of the projection K is in contact, and the end of the crank *h* on the shaft G extends between the inner end of the screw O and the outer part of the dog Q. By this arrangement a vibrating movement is given the hook L by the working of the crank *h* in the slot *g* of the plate M, and the feed-wheel H is moved, by the action of the end of the crank *h*, against the dog Q, friction of the dogs against the inner side of the flange *i* being sufficient to produce that result. The return movement of the feed-wheel is caused by the end of the crank *h* coming in contact with the inner end of screw O, and the length of feed may be graduated as desired by adjusting this screw. R is a nut on the inner end of the shaft I, by which the shaft C is held firmly in its adjusted position in the vertical slot *t* of the projection J on the lower side of the bed-plate A. There is a vertical screw, *m*, which passes through the said arm J, which serves the double purpose of adjusting the shaft I, for the elevation or depression of the feed-wheel H, and preventing the turning of the nut, the point of the screw entering a countersink, *u*, in the side of the nut, and thereby preventing the latter turning when the shaft is turned either way for unscrewing or tightening the nut. The needle-plate K has a hole, $m^{\times}$, punched through it from its outer or upper side downward, in such a manner as to leave a burr, $n$, to serve as a guide to the thread or loop, and prevent it from slipping away from the looper or hook. (See Fig. 1.) In the upper part of the needle-arbor E there is fitted transversely and horizontally a small cylindrical rod, S, which is retained in the arbor by means of a pin, $o$, within the latter, fitting in a groove, $p$, made circumferentially in S at about its center, the pin $o$ being pressed into the groove by a spring, $q$, as shown clearly in Fig. 3. The rod S has a hole, $r$, drilled obliquely into it at each end, for the thread $s$ to pass through.

By this arrangement it will be seen that the thread is drawn straight each time the needle-arbor rises, and does not admit of the thread bowing out so much at the side of the needle opposite to that where the loop is taken, and the thread is kept at a more uniform state of tension, a variation in the thickness of the cloth not affecting it as much as hitherto. By turning the rod S the thread $s$ may be tightened, as desired.

I claim as my invention—

1. The combination of the horizontal rod S, having holes $r$ for the passage of the thread, the pressure-pin $o$, and arbor E, substantially as and for the purpose set forth.

2. The combination of the screw $m$ with the stationary projection J, having a slot, $t$, and the nut E, for adjusting and supporting the feed mechanism, substantially as set forth.

CHRISTOPHER HODGKINS.

Witnesses:

LYMAN E. BIGELOW,

ARTHUR C. HODGKINS.